United States Patent Office 3,331,224
Patented July 18, 1967

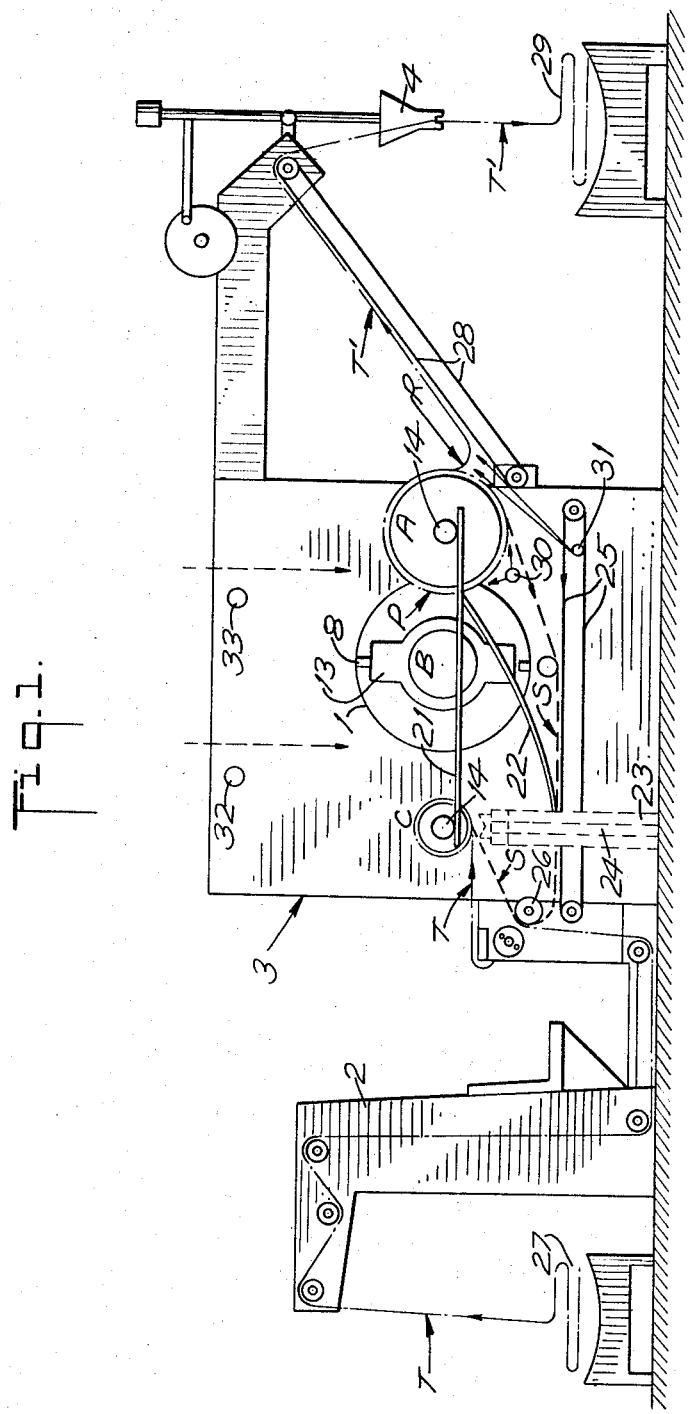

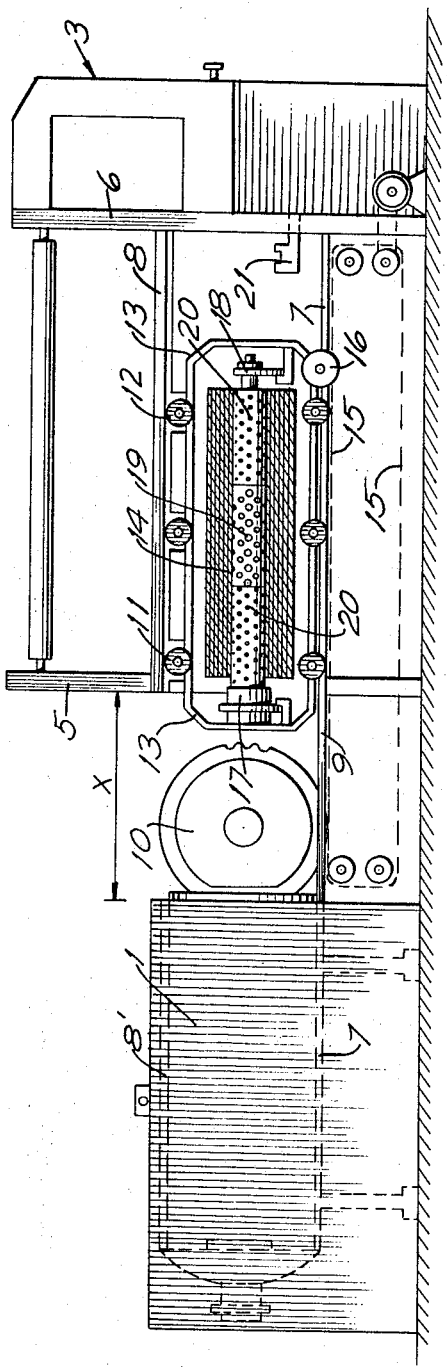

3,331,224
UNITARY EQUIPMENT FOR DECATIZING FABRICS IN AUTOCLAVE
Pietro Alberto, 16 Via Lamarmora, Biella, Italy, and Gerhard Moers, 9/11 Hanbrucherstrasse, Aachen, Germany
Filed Jan. 18, 1965, Ser. No. 426,337
Claims priority, application Italy, Oct. 15, 1964, 22,114/64
15 Claims. (Cl. 68—8)

This invention concerns a unitary apparatus for decatizing fabrics in an autoclave which allows a practically automatic and continuous cycle to be obtained.

It is a well-known fact that one of the most widely used and up-to-date methods for finishing fabrics is that of decatizing in an autoclave and, for this method, a preparation machine and an autoclave are required. Fabric to be treated together with an under layer (flannelette, molleton or sateen) are wound on special decatizing cylinders on the preparation machine while a decatizing operation is carried out in the autoclave on a cylinder previously covered with fabric and an under layer in the preparation machine.

In order to transport cylinders from preparation machine to the autoclave and vice versa, a disassemblable carriage was necessary, the upper part of which entered the autoclave together with a cylinder while the lower part slid along the floor so as to effect actual transport between autoclave and preparation machine; consequently, autoclave and preparation machine had never been joined together in a unitary single whole and could be placed at any desired distance from one another. However, such required at least two carriages for each unit to cover these distances.

This invention concerns a unitary apparatus in which preparation machine and autoclave are joined together by means of an operational device which introduces decatizing cylinders from the preparation machine to the autoclave in a practically automatic and continuous cycle.

The operational device is mainly composed of a system of rails which allow rotation between several cylinders that are submitted to various operation, i.e. rails allow a continuous supply of fresh cylinders on which fabric to be treated and under layer are wound to a single carriage which enters the autoclave as soon as a previously delivered cylinder has been removed. The cylinder which is removed from the carriage is sent on to an unwinding post and from there to a second winding post appertaining to new fabric; from this latter post, the cylinder returns to the carriage. A continuous operation of the unit is thus obtained by causing rotation into the several positions of only three cylinders.

Consequently, excepting cases of movement, viz. changes of position, one cylinder is in autoclave while another is in the winding position and the third is at the unwinding post.

The set of rails comprises: one pair of vertically aligned rails, between which the carriage which carries the cylinders to the inside of the autoclave runs; said rails extend into the autoclave and are fitted with articulation to allow closing of the autoclave door. The distance between the entrance of the autoclave and the preparation machine is less than a carriage length, the carriage runs on to the rails inside the autoclave before leaving the rails appertaining to the preparation unit. The set of rails also comprises one pair of straight rails, complete with articulated parts to bring cylinders from the winding post to the carriage and from the carriage to the unwinding post. Finally, the set of rails includes one pair of curved rails to bring the cylinders from the unwinding post underneath the winding post where suitable devices are fitted to raise the cylinders to the winding position.

It is important to ascertain that the under layer unwound from the cylinder which has come out of the autoclave is drawn along as it is unwound as far as the winding post where it is wound together with fresh fabric to be treated on another cylinder so that equipment according to this invention uses only two under layers of each quality. Should it be wished to change the type of under layer, the unitary equipment is fitted with devices which allow changing of the under layer by maintaining the cylinder rotation system from one position to another.

In the unwinding position of apparatus according to this invention means have been planned in order to avoid treated fabric dropping together with under layer during unwinding of roller, i.e. it remains wound on cylinder for a further partial rotation, up to the last point where other devices cause fabric to come away from cylinder and be sent on to a folder unit.

Also the cylinders on which fabric to be treated is wound are fitted with a special device; as is known, the cylinders are perforated so as to allow air and steam to vent in the autoclave; inasmuch as it has been noted that steam and air tend to escape mainly at ends rather than at centre of cylinder, perforation is differentiated or graduated, i.e. holes are closer together or larger at centre of cylinder so as to balance aforesaid tendency of steam and air which, otherwise, might cause nonuniform decatizing.

In order to better understand the characteristics and advantages of this invention a preferred embodiment is now described in detail with reference to the accompanying drawings, in which:

FIG. 1 is a schematic side view of apparatus according to this invention; and

FIG. 2 is a schematic front view of the same equipment.

Referring now to figures of the drawings, equipment comprises, enclosed in a unitary whole, autoclave 1 for decatizing fabric, fabric feed unit 2 of any known kind, preparation machine generally indicated by reference numeral 3. This unit comprises the introduction and operation device for cylinders, described in detail later, and said equipment comprises at last a folder 4 of any known type.

Preparation machine 3 is composed of two walls 5 and 6 supported by cross pieces. Preparation machine 3 is closely joined to autoclave 1 by means of a pair of vertically aligned rails, a lower one 7 and an upper one 8–8' which extend to inside of autoclave 1. Lower rail 7 is fitted with articulation 9 so as to allow closing of door 10 of autoclave 1, while upper rail 8–8' is interrupted; it must, however, be pointed out that distance X between autoclave 1 and preparation machine 3, which distance is made necessary, as is articulation 9, by operation of autoclave door 10, must not be greater than the distance extent between the first roller 11 and the last roller 12 of carriage 13, so that carriage 13 can run onto the rail portion 8' which is inside autoclave 1 before leaving rail 8 on preparation machine 3.

Carriage 13 joins preparation machine 3 to autoclave 1 to bring in and take out perforated cylinders 14 on which fabric to be treated is wound together with under layer.

Entrance and exit of carriage 13 from preparation machine 3 towards autoclave 1 and vice versa occurs automatically by means of a conveyor chain 15 fitted with a hooking system 16 which detachably hooks onto carriage 13 in order to move carriage 13 with the conveyor chain 15.

It is to be noted that, up to the present time, lifting devices were necessary to raise decatizing cylinders; these means are now eliminated; eventual rails on which at least two conveyor carriages ran (at least one of said carriages remained outside autoclave) were arranged aligned on a horizontal instead of a vertical plane and, consequently, carriage transport could not be automatic. In other words preparation machine and autoclave were two separate units and not closely joined to each other as in the case of this invention.

Carriage 13 is fitted with attachments or closing devices 17 and 18 for automatic fixing of perforated cylinders 14. Side upright 5 is complete with a circular aperture that allows moving of carriage 13 therethrough.

Cylinders 14, as has already been stated, are differentially or gradually perforated, viz. with more holes in the central area 19 than at ends 20, or with larger holes in centre area 19 than at ends 20, or both solutions are used at the same time, in a uniform or discontinuous manner, so that steam and air which, in a normal type of autoclave would tend to escape from ends 20 before coming out of centre 19 on account of the lower resistance presented by roller, composed of fabric and under layer, are balanced by means of this differentiated or graduated perforation. Steam is therefore able to enter and air is allowed to go out in a uniform manner as lack of sealing balance of roller between centre and sides is compensated by the perforation of the cylinder being less pronounced at weakest point (ends 20) and more pronounced at strongest point (central area 19).

In order to effect rotation of perforated cylinders 14, on preparation machine 3, a system of rails is planned, said rail system being composed of one pair of straight rails 21 along which the three fundamental positions are arranged, i.e., unwinding position A, selection position B and winding position C, a pair of curved rails 22 to allow cylinders 14 to pass from position A to lifting mechanism 23 at position C.

Thus, when carriage 13 comes out of autoclave, cylinder 14 which has been subjected to treatment is sent along rails 21 to post A, cylinder which was at A is sent, by means of curved rails 22 to position 24 and then lifted by lifting mechanism 23 to position C. Cylinder 14 with a new load of fabric to be treated, which was at position C is placed on carriage 13 running on said straight rails 21 and thus enters autoclave 1 together with carriage 13 running on rails 78.

Lifting mechanism 23 may be made in any equivalent mechanical manner known in the art, e.g., each mechanism 23 may be in the form of two jacks each with a threaded shaft 24 which, when rotating, lift cylinder 14 so that it is held at the top ends of the shafts 24 electromagnetically. The shafts 24 may also be raised by oil-hydraulic devices or by means operating on compressed air.

Under layer S (shown in dotted lines in FIGURE 1) which is unwound in position A is rewound on another cylinder at post C; it is carried from one position to the other by means of a conveyor band 25 or other similar device till it reaches return roller 26 passing on to post C where it is wound on cylinder 14 together with fabric T which is to be treated and comes from feed machine 2, taken from stock 27, by means of a set of stretcher return rollers of a known type.

Fabric T' already treated and unwound at post A is sent, by means of a conveyor belt 28 or by a similar device, to folder 4 where it is formed into pieces or rolls 29. (Fabrics T and T' are shown in FIGURE 1 by dash and dot lines.)

In order to separate under layer S from treated fabric T' at post A, the preferable method is that of air blowing, but rotating brushes could also be used as could pincers or similar devices.

An air blowing system (compressed air or fans) is shown in FIGURE 1. When under layer S has been started on conveyor band 25, air blowers 30 and 31 are put in action. The first air blower 30 prevents fabric T' dropping together with under layer S on to conveyor band 25 by blowing a stream of air between fabric T' and layer S to keep fabric T' adherent to cylinder 14 until the critical point P in the rotation of the cylinder has been passed. Beyond this point, fabric T' remains on the cylinder of itself and moves up to separation point R where the second air blower 31 causes fabric T' to become moved from the roll and sends it onto and along conveyor band 28. Direction of air blowers' action is shown by arrows in figure.

When it is wished to change the quality of under layer S so as to obtain different decatizing results, two supplementary rollers 32 and 33 are provided on preparation machine 3.

One of the two rollers (e.g., 33) carries the fresh rolled under layer and from here the latter is sent to winding post C, while on the other roller (e.g., 32) the under layer which is taken from unwinding post A, is duly wound. To date spare under layers were removed from machine and placed on separate carriages.

The above description shows the operation of the equipment in full detail, but it will now be summed up in its various phases.

A cycle of operations effected by the equipment starts with carriage 13 coming out of autoclave 1 carrying a cylinder 14 on which a roll of treated fabric together with its respective under layer is wound while, at that moment a roll of fabric T to be treated has finished winding at post C (winding post). This roll of fabric is wound with under layer coming from cylinder 14 arranged at unwinding post A so that this latter cylinder is completely empty at that moment.

When carriage 13 reaches the end of a stroke on preparation machine 3, the empty cylinder which was at post A is pushed and, by means of curved rail 22, it rolls down to lifting mechanism 23 which is put in motion and begins to lift the aforesaid empty cylinder.

Then cylinder 14 loaded on carriage 13 which contains the roll that has just been treated in autoclave 1, receives a push and sliding to the right on rails 21, reaches unwinding post A.

In the meantime, the empty cylinder, pushed upwards by lifting mechanism 23, hits full cylinder which is at a post A. This full cylinder, sliding on rails 21, passes on to carriage 13, which starts again automatically being drawn by traction chain 15, and enters autoclave 1; when the articulation 9 of lower rail 7 is lowered out of the path of door 10, door 10 closes and a new decatizing operation starts in autoclave 1. At the same time of decatizing, unwinding at post A and winding at post C take place.

When cylinder 14 which is in position A, starts rotating, under layer S (as already stated, a porous fabric which is generally cotton and is also known as sateen, molleton or flannelette) unwinds and drops by gravity on to conveyor belt 25 which, being set in motion, carries it to roller 26, whence the operator takes up the end of under layer S winding it round the empty cylinder which is at winding post C and rotates at the same time as the cylinder at post A; when a few turns have been wound so as to form a firm thickness, operator will start to insert the fresh fabric T to be treated (which comes from feed unit 2) together with under layer S.

While unwinding of cylinder at post A is continued, fabric T' which has been subjected to treatment appears and would also drop on to conveyor belt 25 if air blast coming from air blower 30 were not to keep it adherent to surface of roll which has not yet been unwound, until such time as fabric T' having reached position R, receives a counterthrust of air coming from nozzles 31 operated by control when under layer S has already started on conveyor band 25 and, in this way, the fabric is compelled to detach itself from the roll and drop by gravity on to conveyor bands 28 which start treated fabric T' on its way to folder unit 4.

At the end, cylinder at post A will remain empty and that at post C will be full of fabric T to be treated, wound together with under layer S, and at this moment, everything is ready to repeat the cycle of operations which have been described, as soon as the cylinder which is in the autoclave, is ready to come out after being decatized. At post A and C it is also possible to obtain further cooling of fabric and under layer by means of suction obtained by using vacuum pumps.

If it is necessary to change quality of under layer, it will suffice to start under layer which unwinds from cylinder at post A, toward roller 32 (or 33) instead of onto conveyor bands 25 and at the same time, or immediately after, wind spare under layer which is rolled on roller 33 (or 32) together with fabric T coming from feed unit 2, on to cylinder that is at post C.

It is to be understood that numerous variations, modifications, additions and changes of parts can be made to described and illustrated equipment, without leaving the field of this invention.

We claim:
1. An apparatus for decatizing fabrics in an autoclave comprising
an autoclave,
a preparation unit having first means for winding fabric onto cylinders to form rolls and second means for unwinding decatized fabric from the cylinders,
means between said autoclave and preparation unit for conveying rolls of fabric between said autoclave and preparation unit, said means including a carriage for carrying a roll of fabric, a first pair of vertically aligned rails mounting said carriage for guiding said carriage with respect to said autoclave, and rail means for conveying rolls of fabric into a plurality of working positions, said positions including a winding position on one side of said autoclave at said means for winding fabric, an unwinding position of the other side of said autoclave at said means for unwinding decatized fabric and a central position on said carriage whereby a roll of fabric can be wound at said winding position simultaneously with decatizing of a roll of fabric in said autoclave and unwinding of a decatized roll of fabric at said unwinding position and whereby the cylinders at said positions can be conveyed in cyclic fashion between said positions.

2. An apparatus as set forth in claim 1 further comprising a fabric feed unit for delivering fabric to the winding position.

3. An apparatus as set forth in claim 1 further comprising a folder for folding fabric delivered from a roll at said unwinding position.

4. An apparatus as set forth in claim 1 wherein said vertically aligned rails include a hinged portion for movement away from said autoclave.

5. An apparatus as set forth in claim 4 wherein said autoclave and preparation unit are spaced a distance less than the length of said carriage whereby said carriage engages a first portion of said rails inside said autoclave before leaving a second portion of said rails on said preparation unit.

6. An apparatus as set forth in claim 1 wherein said rail means includes a pair of straight rails and a pair of curved rails leading from said straight rails at a location between said unwinding and central positions to a location below said winding position.

7. An apparatus as set forth in claim 6 further comprising a lifting mechanism at said location for lifting a cylinder therefrom to said winding position.

8. An apparatus as set forth in claim 7 wherein said lifting mechanism includes a screw jack provided with a means for holding a cylinder.

9. An apparatus as set forth in claim 1 further comprising conveyor means below said positions for moving an under layer from said unwinding portion during unwinding from a roll thereat to said winding position for winding into the roll of fabric thereat.

10. An apparatus as set forth in claim 9 further comprising means for separating fabric and an under layer from a roll of interleaved fabric and under layer at the unwinding position.

11. An apparatus as set forth in claim 10 wherein said separation means includes a device for directing a first blast of air to keep the fabric adherent to the surface of the roll while the under layer is free to drop clear of the roll, and a device for directing a second blast of air to lift the fabric clear of the roll, the points at which the fabric and the under layer leave the roll being circumferentially separated.

12. An apparatus as set forth in claim 1 further comprising conveyor means for receiving fabric removed from a roll at said unwinding position and a folder in cooperation with said conveyor means for folding fabric delivered from said conveyor means.

13. An apparatus as set forth in claim 1 further comprising a conveyor chain having means for engaging said carriage, said chain being operable to propel said carriage between said autoclave and preparation unit.

14. An apparatus as set forth in claim 1 wherein said preparation unit includes decatizing cylinders having perforations, said perforations being closer and larger at the central portion of the cylinders than at the ends.

15. An apparatus as set forth in claim 1 wherein said preparation unit has a pair of rollers, one of said pair of rollers receiving unwound under layer from said unwinding position and said other of said pair of rollers having a supply of under layer thereon at said winding position whereby said supply of underlayer can be fed to said winding position in place of said unwound under layer.

References Cited
FOREIGN PATENTS
71,613  10/1893  Germany.
542,446  1/1942  Great Britain.

IRVING BUNEVICH, *Primary Examiner.*